W. WAGSTAFF.
Tea Kettle.
No. 80,576.
Patented Aug. 4, 1868.
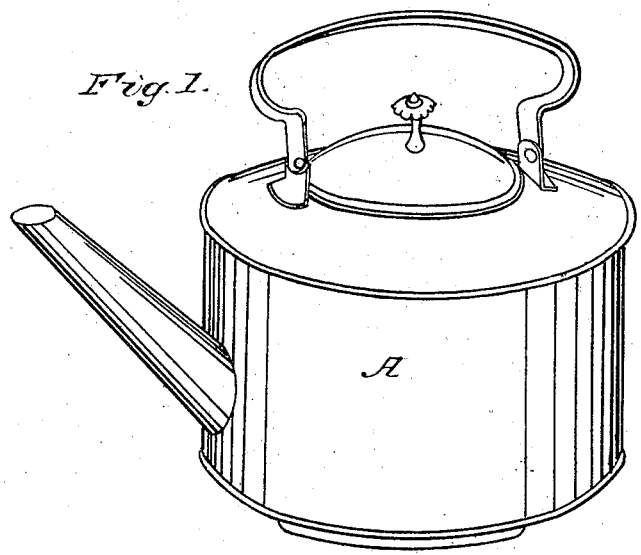
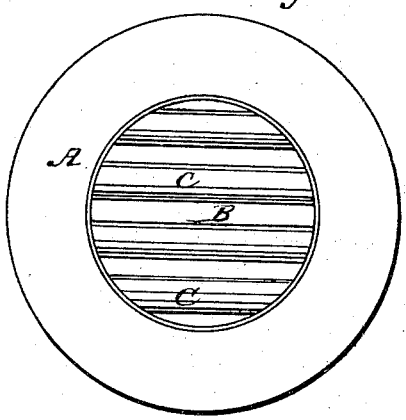
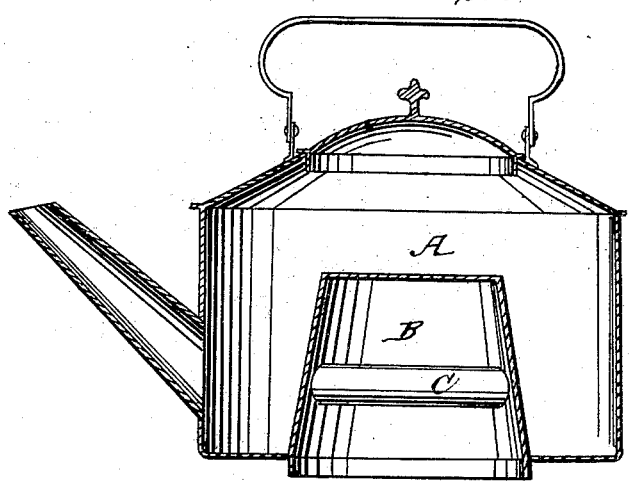
Witnesses
J H Burridge
K Coon
Inventor
W Wagstaff

United States Patent Office.

W. WAGSTAFF, OF MILLBURY, OHIO.

Letters Patent No. 80,576, dated August 4, 1868.

---

IMPROVEMENT IN TEA-KETTLES, COFFEE-POTS, &c.

---

The Schedule referred to in these Letters Patent and making part of the same.

---

TO ALL WHOM IT MAY CONCERN:

Be it known that I, W. WAGSTAFF, of Millbury, in the county of Wood, and State of Ohio, have invented certain new and useful Improvements in Tea-Kettles, Coffee-Pots, &c.; and I do hereby declare that the following is a full and complete description of the same, reference being had to the accompanying drawings, making part of this specification, in which—

Figure 1 is a perspective view of the kettle.

Figure 2 a vertical transverse section.

Figure 3 a view of the bottom.

Like letters of reference refer to like parts in the different views presented.

In fig. 1, A represents the kettle, which is of the ordinary shape and size. Proceeding inward from the bottom is a chamber, B, fig. 2. Opening to the outside, as shown in fig. 3, transversely across said chamber, are arranged pipes, more or less in number, and which are in open communication with the inside of the kettle, into and through which the water flows freely on filling the vessel.

It will be obvious that a kettle thus constructed offers a much larger surface to the fire than the ordinary one, by which, when used on a stove, the heat is confined to the bottom of the vessel; hence requiring a long time to heat and boil the water; whereas with a kettle constructed with a chamber and tubes, as above described, the heat is allowed to ascend up into the body of the kettle, and over and around the pipes, which, being filled with water, and the chamber surrounded by the same, it is quickly heated and made to boil, thereby economizing largely in the matter of time and fuel.

I am aware that chambers, pipes, flues, and auxiliary heaters have been used in connection with boilers, &c., and that they have been variously constructed and arranged in combination therewith; hence I do not claim these; but

What I claim is—

The transverse arrangement of the pipes C in the chamber B, and in combination with the tea-kettle or coffee-pot A, in the manner as and for the purpose set forth.

W. WAGSTAFF.

Witnesses:
J. H. BURRIDGE,
E. E. WAITE.